Dec. 19, 1961  C. E. ANDERSON ET AL  3,013,770
FABRICATED VALVE BODY
Filed July 23, 1958  3 Sheets-Sheet 1
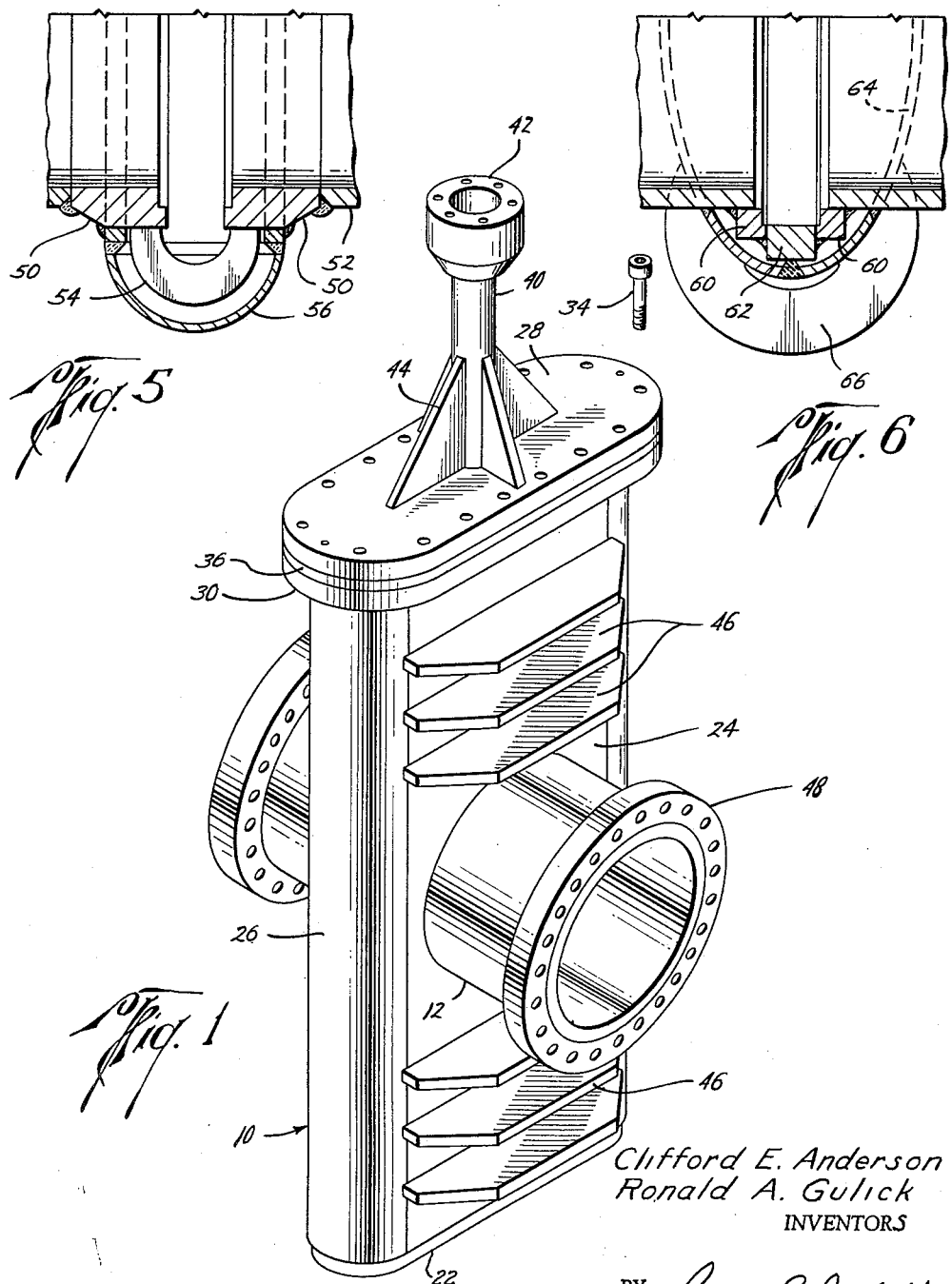
Clifford E. Anderson
Ronald A. Gulick
INVENTORS
BY *Russell E. Dehlorf*
ATTORNEY

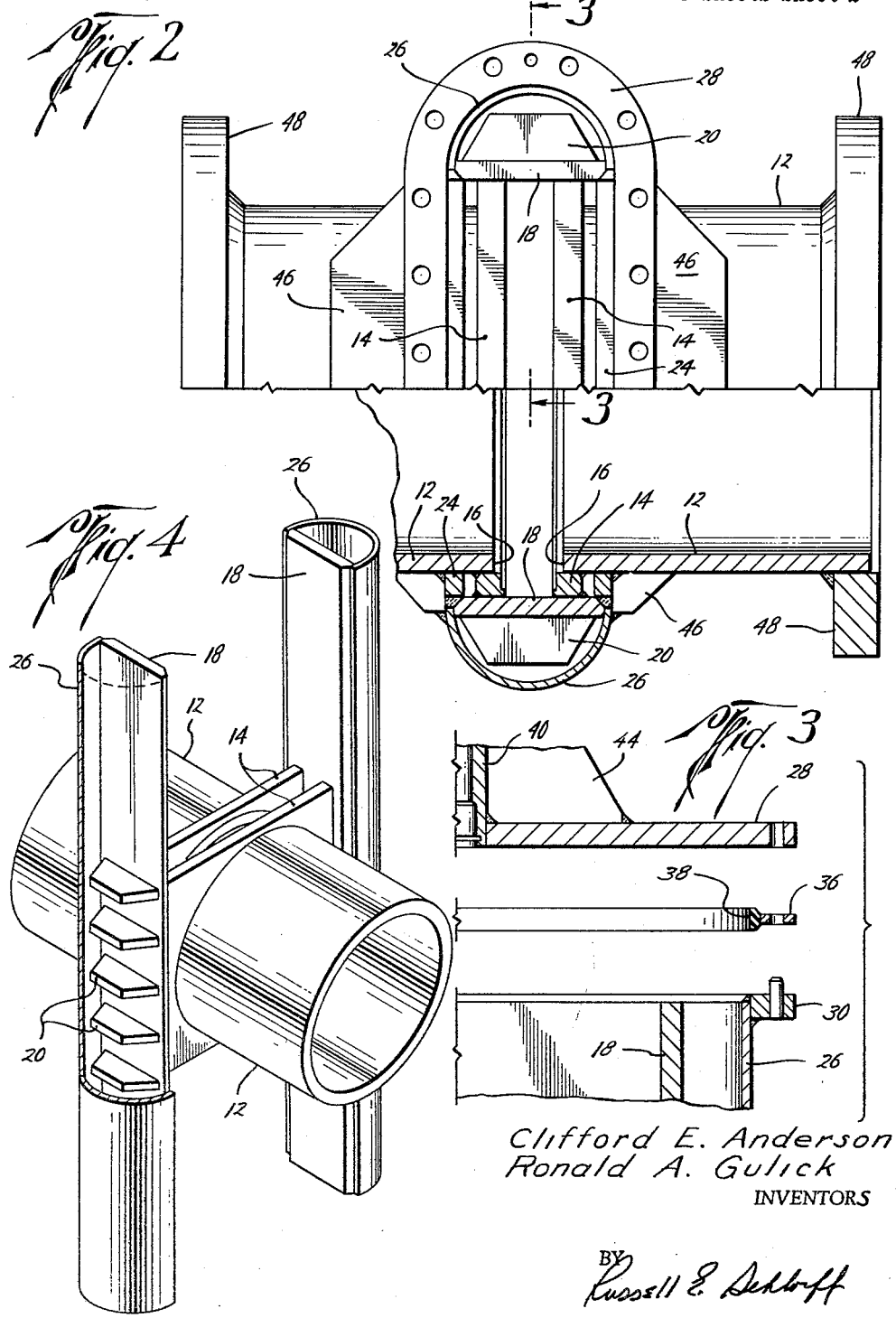

Clifford E. Anderson
Ronald A. Gulick
INVENTORS

United States Patent Office 3,013,770
Patented Dec. 19, 1961

3,013,770
FABRICATED VALVE BODY
Clifford E. Anderson and Ronald A. Gulick, Houston, Tex., assignors to ACF Industries, Incorporated, New York, N.Y., a corporation of New Jersey
Filed July 23, 1958, Ser. No. 750,424
13 Claims. (Cl. 251—329)

This invention relates to a fabricated gate valve, and more particularly to the body therefor.

In applications where it is desirable to keep turbulence to a minimum or where scrapers are run through the pipeline, through conduit type gate valves are used. In such valves, the reciprocating gate member is provided with a passage which in the open position becomes a part of the line. Since the gate member is provided with a passage, the gate member will extend past the conduit in both open and closed position. In one position it will be on one side of the conduit and in the other position it will be on the other side of the conduit. Accordingly, the valve body has to be designed to accommodate the gate member. Customarily, the bodies for these valves have been cast; however, the cost of patterns represents a large initial expense, which if the number to be produced is small, makes the cost of the casting relatively expensive. In order to reduce the cost of the body, efforts have been made to fabricate the bodies from plate metal or a combination of forgings, castings and plate metal. While the fabrication of regular gate valves (non through conduit) has been successfully applied, the fabrication of through conduit gate valves has not been too successful. A valve body not only has to retain the pressure of the lading flowing through the valve, but it must also carry the external loads applied to the body by the line. To carry this load either the body can be fabricated from materials having the requisite strength necessary to carry the load or a reinforcing member can form a bridge between the two conduits. In regular gate valves the bridging can take place around the full bottom of the conduit and has presented no particular problem; however, in through conduit valves the conduits can only be bridged on the sides. While in cast bodies the walls are increased to carry such loads, one of the primary objectives of fabrication is to reduce costs, and since a shell to contain the fluid is much lighter than would be required for a load carrying vessel, the second alternative, bridging the two conduits, is the usual practice to provide for the load carrying function. One method to form the bridge between the two conduits is to provide a reinforcing member about the shell. However, by going outside the shell to construct the bridge, another factor comes into play and that is, an increased bending moment. Therefore, the line carrying reinforcement not only has to be sufficiently strong to carry the required line loads but has to also carry the additional load which is multiplied by the distance which the member is removed from the run of the valve.

In the present invention there is a fully fabricated through conduit gate valve body. That is, the entire body can be constructed from plate metal without the use of any castings or forgings. The proposed body comprises two axially aligned, spaced, cylindrical conduits which form the passageway of the valve. Seat carrying plates are attached to the opposed ends of such conduits. Such plates form the valve chamber which receives the gate member. The seat carrying plates are machined to provide opposed annular pockets receiving the valve seats. Conduit connecting members join the two seat carrying plates together. The conduits, seat carrying plates, and the conduit connecting members form the skeleton of the valve. The conduit connecting members, which carry the line and gate load of the valve, are in close proximity to the run of the valve and, therefore, bending moment is maintained at a minimum. Line loads are those loads which are externally produced upon the valve, i.e., the load caused by thermal expansion of the connecting piping, the load caused by mechanical loads or shocks on the connecting piping, loads caused by torsion, etc. Gate loads are those loads produced by differential pressure across the closed gate. Reinforcing ribs may be attached to the conduit connecting members in approximately the region of the seat carrying plates to reduce the thickness of the overall member. Pressure containing plates are attached to the conduit connecting members to form the outside shell for the valve body. The outside shell only acts as a pressure containing vessel and is not required to carry any of the line or gate load; therefore, it can be constructed of plate designed to carry the rated pressure flowing through the valve. By so constructing the valve body, all line and gate loads are carried by the structurally constructed skeleton and the shell is only required to hold pressure. Therefore, all line carrying members are contained within the valve body and as a consequence, the line loads can be carried with a lesser mass.

It is the primary object of the present invention to provide a fully fabricated gate valve body in which all the line and gate loads are carried by the skeleton and the shell is utilized only to retain the pressure.

It is another object to form a fabricated through conduit gate valve body which maintains the structural members carrying the line and gate load as close to the run of the valve as possible.

It is a further object to provide a fabricated gate valve body which is formed by first building a skeleton and then wrapping a pressure retaining shell around such skeleton.

It is a still further object to provide a method of fabricating in which there are no hidden welds during the process of fabrication.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and are shown in the accompanying drawings, forming a part of the specification, wherein:

FIG. 1 is an isometric view showing a fabricated gate valve body formed in accordance with the present invention.

FIG. 2 is a top elevation of the body shown in FIG. 1, a portion being in section at approximately the center line to show details of construction.

FIG. 3 is a vertical section in exploded relation taken generally along lines 3—3 of FIG. 2.

FIG. 4 is an isometric view showing the skeleton of the body.

FIG. 5 is a sectional view showing an alternative form of construction.

FIG. 6 is a view similar to FIG. 5 showing another alternative form of construction.

Figure 7:
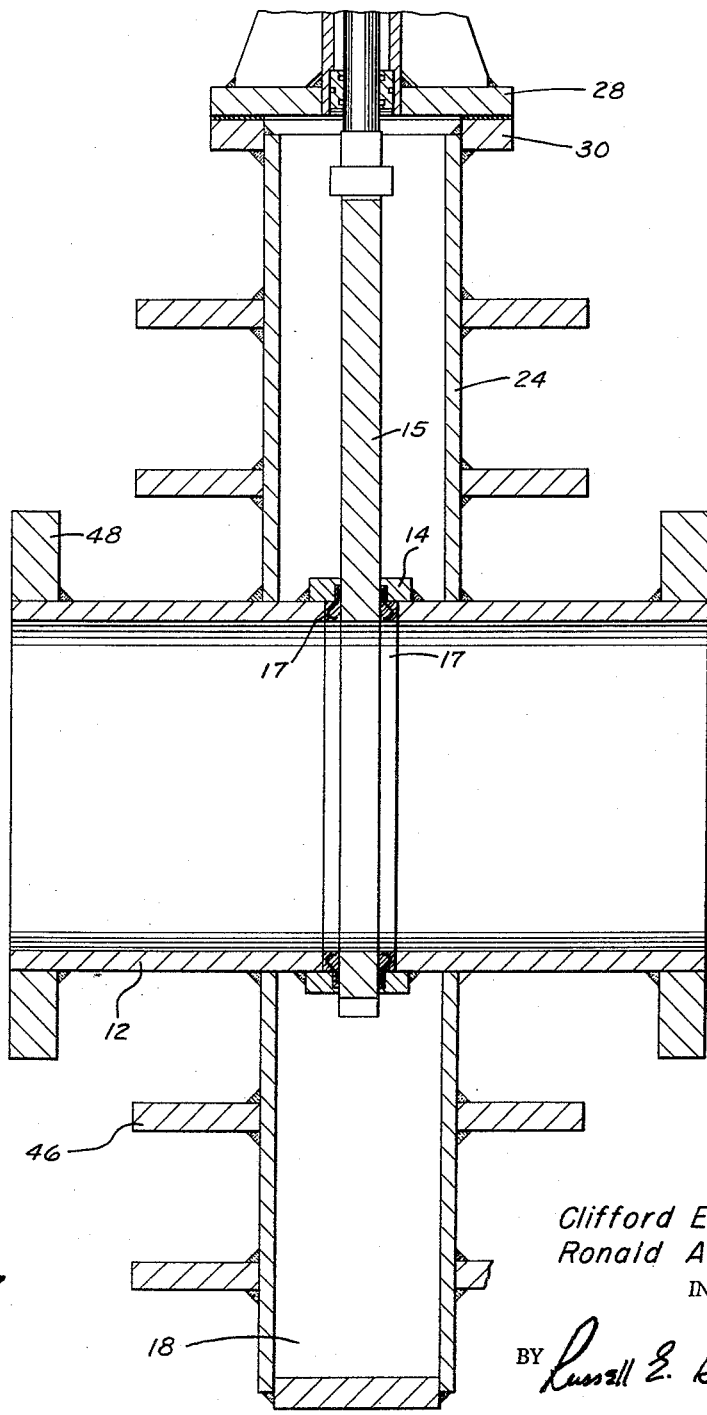
FIG. 7 is a vertical section of a fabricated valve body showing a valve gate and seats in position.

Referring now to the drawings, the body 10 is constructed by first forming a structural skeleton, see FIG. 4, which is a load carrying member, and then covering such skeleton with the necessary elements to make it a pressure containing vessel.

Attention is directed to FIG. 4 where the structural skeleton is shown. The skeleton is formed of two axially aligned spaced cylindrical conduits 12—12 which form the passageway or run of the valve. The conduits can be formed from rolled plate welded together or cast pipe. Bearing plates 14—14, attached to the opposed ends of the conduits 12—12, form seat carrying portions. In some applications using cast pipe, the seat carrying portion can be formed as an integral portion of said pipe. The bearing plates 14—14 are so spaced to form a valve chamber which receives the gate member 15. The opposed faces of the bearing plates 14—14 are machined to provide opposed annular pockets 16—16 which will receive the valve seats 17. The size of the bearing plate is governed by the size of the seat 17 which it has to accommodate. The thickness is based on the bending moment which it will receive. Therefore, the size of the bearing plate is kept to a minimum. Conduit connecting members 18—18 join the two bearing plates 14—14 together in their spaced relationship. The side plates extend past the bearing plates in all directions to receive the shell as will be described subsequently. In order to cut down on the thickness of such members, the conduit connecting members 18—18 may be provided with a multiplicity of spaced ribs 20 in the area of the bearing plates. The ribs give the conduit connecting members the necessary strength to support the line and gate loads at the place where such strength is necessary. Since the bearing plates extend past the conduit as short a distance as is feasible, the conduit connecting members are in as close proximity to the run of the valve as is physically possible. Therefore, the load which has to be carried by the conduit connecting members 18 in bridging between the two conduits is not appreciably increased by moment as would be the case if the bridging member was placed outside the shell of a valve. The conduits, bearing plate and conduit connecting members form the skeleton of the valve and theoretically, together with the seats 17 and the gate member 15, will work as a valve. The conduit connecting members 18 also act as a guide for the gate 15.

In order to accommodate the fluid which will flow into the valve body during the intermediate position of the valve gate member 15, a shell is placed around the skeleton. The shell is comprised of a bottom plate 22, side plates 24—24, ends plates 26—26 and a bonnet 28. In order that the bonnet 28 will be removable so that the seats 17 and gate member 15 can be readily replaced, a flange 30 is attached to the shell and the bonnet 28 is then disengagedly connected to the flange 30 by use of threaded members 34. To prevent leakage around the flange, a metal gasket 36 having a bonded resilient intercore 38 is placed between flange 30 and the bonnet plate 28. Cylindrical member 40, which accommodates the stem of the valve, and a bearing receiving portion 42, which receives the thrust bearings for the valve, are attached to the bonnet plate 28. The necessary rigidity is supplied to the cylindrical member 40 by reinforcing members 44. Internal pressure in a body tends to force the body to a spherical shape and plates such as the side plates 24 have to either be of sufficient strength to withstand such forces or be reinforced. In order so that the pressure containing plate 24 can be kept to a minimum thickness, it is reinforced with ribs 46. Since the pressure containing plate 24 only acts as a pressure vessel, the ribs are only necessary to reinforce the plate to contain the pressure within the body and not to carry line loads. The side members 18 do not extend to the top of the side plates and therefore half sections of pipe forming the end plates 26—26 are attached to the side plates 24—24. By utilizing the end plates 26—26 instead of having the conduit connecting members 18 act as part of the shell, several significant advantages are obtained. First, since pressure on both sides of the conduit connecting member 18 are equal, there will be no bending force tending to force the center of the member out. Moreover, there will be no bending at the juncture of the side plates 24 and conduit connecting members 18. In order so that the valve can be connected to a piping system, appropriate bolting flanges 48, or other well known means of attaching a valve to a pipe, may be attached to the end of the conduits 12.

FIGS. 5 and 6 show alternative forms of construction which in effect are only slightly different methods of carrying the line load. Essentially, in all forms a structural skeleton carrying the line load is covered by pressure containing plates forming a shell. Since loads, particularly seat loads, increase by the square of the nominal valve size, rigidity is a more important fastor as size increases. In FIG. 5 the seat carrying members 14 of FIGS. 1 to 4 are replaced by heavy hub sections 50, which can be forged, cut or cast. The outer portions taper down to join the conduits 52. Instead of having the reinforced conduit connecting members 18, there is a multiplicity of C shaped clips 54 which join the two hub sections 50 together. Above and below the clips 54 there is a structural member to which the shell is attached in the same manner as FIG. 1. In FIG. 6, the seat carrying members 60 are similar to the seat carrying members shown in FIG. 1; however, the conduit connecting members 62 are disposed between the conduit carrying members 60, and an elliptical shell 64 is attached to each member 62. The member 62 extends all the way from the top to the bottom of the valve and acts as a guide for the gate and as a back up plate for completing the weld. C-shaped ribs 66 are placed around the shell 64 to reinforce it against internal pressure.

While the invention is particularly advantageous for through conduit construction, it may also be used for non through conduit bodies by eliminating the lower portion of the body. The advantages of first constructing the structural skeleton and then attaching a pressure containing shell thereto will be applicable.

The invention not only relates to the fabricated valve body which has just been fully described, but also relates to a facile method of forming a fabricated body. To construct the body 10, a sheet or plate is rolled and welded to form a conduit 12 and the bearing plates 14 are welded thereto. If cast pipe is used, the bearing plate may be in an integral part of such pipe. The conduit connecting members 18 are prepared by welding thereto the ribs 20 and the end pipe 26 which may be formed from a half section of pipe. The two conduit assemblies are properly spaced and the conduit connecting assemblies are welded to the edges to form the skeleton shown in FIG. 4. As previously mentioned, the skeleton provided with necessary seats and through conduit gate member could act as a valve. While the lading would escape in movement from one position to another, all the other necessary elements are present. The skeleton is the structural frame and carries the load of the line and gate. The side plates 24 are welded to the skeleton and the bonnet flange 30 is slipped over the shell and welded to the top of the valve. All of the steps are so designed that there are no hidden welds during process of fabrication. After the body has been assembled to such a stage, the seat pockets 16 are machined. By machining the pockets at such time, any deformation caused by welding can be corrected. After machining, the body is thoroughly cleaned out and the base plate 22 welded into position completing the fabrication of the body.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

We claim:

1. A fabricated gate valve body comprising two axially aligned, spaced, cylindrical conduits, said conduits forming the run of the valve, bearing plates attached to the opposed ends of said conduits, said plates being spaced to form a chamber to receive a gate member, said bearing plates having opposed annular valve seats, two conduit connecting plates joining two parallel sides of said spaced bearing plates together, the conduit connecting plates being in close proximity to the run of the valve and carrying the line and gate load of the valve, the conduits, bearing plates and conduit connecting plates forming the skeleton of the valve, pressure containing plates attached to the skeleton to form a chamber about the skeleton to contain the pressurized fluid passing through the valve.

2. The structure specified in claim 1 characterized in that the conduit connecting plates are structurally reinforced in the region of the bearing plates.

3. The structure specified in claim 1 characterized in that the pressure containing plates are structurally reinforced.

4. A fabricated gate valve body comprising two axially aligned, spaced, cylindrical conduits, said conduits forming the run of the valve, generally square, flat, bearing plates attached to the opposed ends of said conduits, said bearing plates being spaced in parallel relationship to form a chamber to receive a gate member, said bearing plates having opposed annular pockets to receive valve seats, conduit connecting plates securing said spaced bearing plates together, said conduit connecting plates extending past the ends of the bearing plates, said conduit connecting plates being provided with a multiplicity of strengthening ribs in the region of the bearing plates, the conduits, bearing plates and conduit connecting plates forming the skeleton of the valve, pressure containing plates attached about the skeleton to form a pressure containing shell for the fluid passing through the valve, said shell forming chambers on both ends of the valve chamber wherein the valve member may be received, and reinforcing ribs attached to at least two of the pressure containing plates.

5. A fabricated gate valve body comprising two axially aligned, spaced, cylindrical conduits, said conduits forming the passageway of the valve, spaced seat carrying members attached to the opposed ends of said conduits, said seat carrying members being spaced to form a chamber to receive a gate member, said seat carrying members having opposed annular pockets to receive valve seats, structural members joining said seat carrying members together, the structural members being in close proximity to the passageway of the valve and carrying the line and gate load of the valve, said structural members extending past the edges of the seat carrying members, said structural members being provided with a multiplicity of strengthening ribs in the region of the seat carrying members, the conduits, seat carrying members and structural members forming the skeleton of the valve, pressure containing plates around the conduit spaced from the seat carrying members attached to the structural members, the structural member terminating slightly below said pressure containing plates, half sections of pipe covering the ribs of the structural members, the pipe being the same height as the pressure containing plates, a base plate attached to the bottom of the pressure containing plates and half sections of pipe, a bonnet receiving flange attached to the top of the pressure containing plates and half section of pipe and a bonnet plate disengageably attached to the bonnet receiving flange, the pressure containing plates, half section of pipe, base plate and bonnet plate forming a chamber to contain the pressurized fluid passing through the valve.

6. The structure specified in claim 5 characterized in that strengtheining ribs are attached to the pressure containing plates.

7. A fabricated gate valve body comprising two axially aligned, spaced, cylindrical conduits, said conduits forming the passageway of the valve, seat carrying members attached to the opposed ends of said conduits, said seat carrying members being spaced to form a chamber to receive a gate member, said seat carrying members having opposed annular pockets to receive valve seats, conduit connecting members joining said seat carrying members together, the conduit connecting members being in close proximity to the passageway of the valve and carrying the line and gate load of the valve, the conduits, seat carrying members and conduit connecting members forming the skeleton of the valve, shell attaching members secured to the conduit connecting members, pressure containing plates forming a chamber about the skeleton to contain the pressurized fluid passing through the valve attached to the shell attaching members.

8. A fabricated gate valve body comprising two axially aligned, spaced, cylindrical conduits, said conduits forming the passageway of the valve, seat carrying plates attached to the opposed ends of said conduits, said plates being spaced to form a chamber to receive a gate member, said plates having opposed annular pockets to receive the valve seats, structural members joining said seat carrying plates together, the structural members being in close proximity to the passageway of the valve and carrying the line and gate load of the valve, an elliptical shaped shell forming a chamber to contain the pressurized fluid passing through the valve attached to the structural members, a multiplicity of C shaped ribs reinforcing said shell.

9. The method of fabricating a through conduit valve body, said method comprising: welding a seat carrying plate to the inner end of each of two prepared conduits, axially aligning and spacing the two prepared conduits a proper distance to form a chamber between the opposed seat carrying members to receive a gate, welding structural members to two parallel sides of the seat carrying members to form a skeleton, welding a pressure containing shell to the skeleton to form chambers to receive the gate on two sides of the conduit, machining the seat carrying plates to form valve seat pockets.

10. The method of fabricating a through conduit valve body, said method comprising: welding a seat carrying plate to an end of each of two prepared conduits, axially aligning and spacing the two prepared conduits, said seat carrying members opposing each other and spaced a sufficient distance apart to form a valve gate chamber to receive a gate, welding structural members to two parallel sides of the seat carrying members thereby forming a skeleton, welding a pressure containing shell to the skeleton to form pressure containing chambers on the two sides of the valve gate chamber which do not have the structural members, the pressure containing shell together with the skeleton forms a valve body.

11. A fabricated gate valve body comprising: two axially aligned, spaced, cylindrical conduits, said conduits forming a passageway of the valve, two seat carrying members, one of said seat carrying members attached to one of the opposed ends of said conduits and the other seat carrying member attached to the opposed end of the other conduit, said seat carrying members being spaced apart sufficiently to form a valve gate chamber, conduit connecting members secured to parallel sides of said seat carrying members to form a skeleton of the valve, plates attached to the skeleton to form a pressure containing shell about the skeleton.

12. A fabricated gate valve body comprising: two axially aligned spaced cylindrical conduits, said conduits forming the passageway of the valve, two seat carrying members, one of said seat carrying members attached to one of the opposed ends of said conduits the other seat carrying member attached to the opposed end of the other conduit, said seat carrying members being spaced apart sufficiently to form a valve gate chamber, conduit connecting members joining said seat carrying members together, the conduit connecting members being in close proximity to the passageway of the valve and carrying the line and gate load of the valve, the conduits, the seat carrying members and the conduit connecting members forming a skeleton of the valve, pressure containing plates attached to the skeleton forming pressure containing chambers on two sides of the valve gate chamber which together with the skeleton forms a valve body.

13. A fabricated gate valve body comprising: two axially aligned, spaced, cylindrical, conduits forming the passageway of the valve, the opposed ends of said conduits provided with seat carrying portions, said seat carrying portions being generally parallel to each other and spaced apart sufficiently to permit insertion of a valve gate therebetween, conduit connecting members securing the two conduits together in said spaced relation, the conduit connecting members being located along two sides of the conduits whereby there are two generally parallel free areas so that a valve gate can extend beyond the seat carrying portions on two sides, the conduit connecting members being in close proximity to the passageway of the valve and carrying the line and gate load of the valve, the conduits and conduit connecting members forming a skeleton of the valve body, a shell about said skeleton with pressure containing chambers on opposite sides of the passageway, the shell together with the skeleton uniting to form a valve body.

References Cited in the file of this patent

UNITED STATES PATENTS 2,683,581     Rovang _____ July 13, 1954

FOREIGN PATENTS 508,384     Belgium _____ of 1952